June 19, 1951   J. V. SHARP   2,557,698
METHOD OF CORRECTING RESIDUAL RADIAL DISTORTION
IN OPTICAL IMAGE-FORMING SYSTEMS
Filed Jan. 7, 1949   2 Sheets-Sheet 1
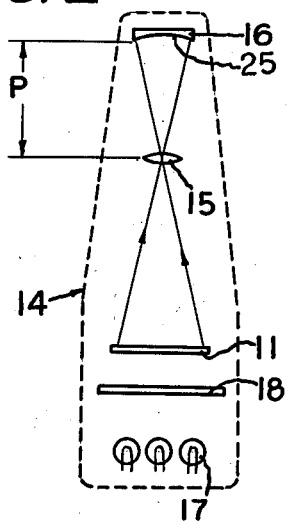
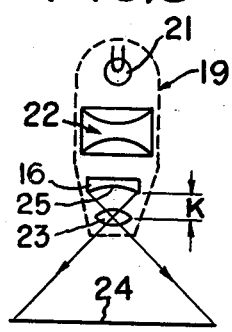
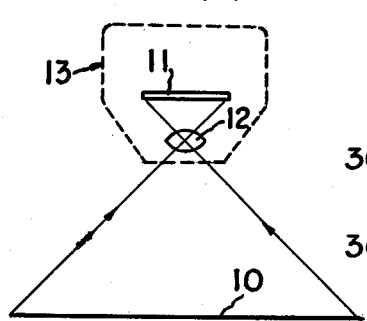
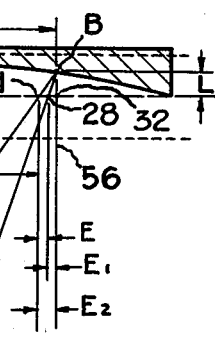
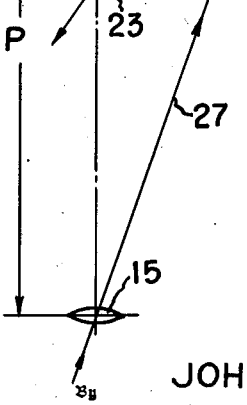
Inventor
JOHN V. SHARP
Edward H. Lumpston
Attorney

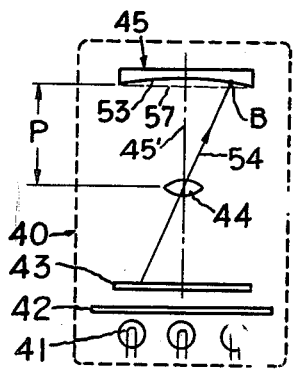
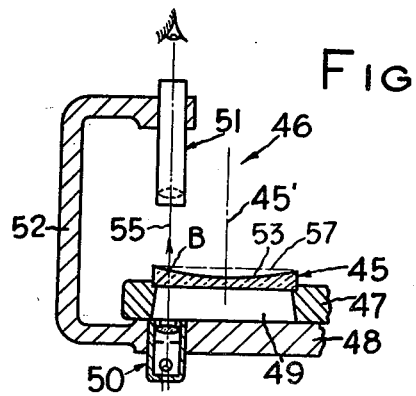
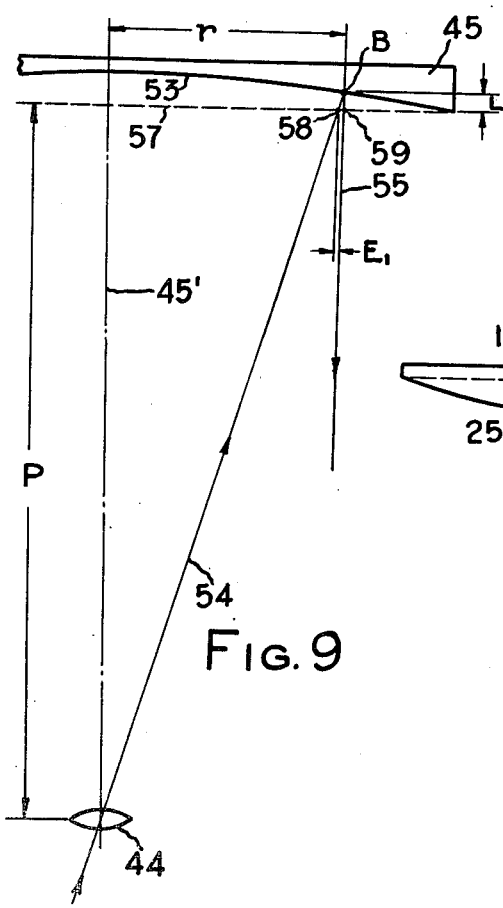
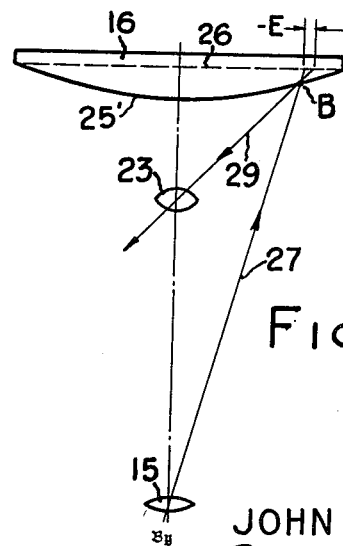

Patented June 19, 1951

2,557,698

UNITED STATES PATENT OFFICE 2,557,698

METHOD OF CORRECTING RESIDUAL RADIAL DISTORTION IN OPTICAL IMAGE-FORMING SYSTEMS

John V. Sharp, Penfield, N. Y., assignor to Bausch & Lomb Optical Company, Rochester, N. Y., a corporation of New York Application January 7, 1949, Serial No. 69,808

12 Claims. (Cl. 88—57)

This invention relates to the art of forming optical images and, more particularly, to methods of correcting optical distortion of an image in optical image-forming systems.

Image-forming systems, employing more than one image-forming step, frequently produce an imperfect final image of an object surface due to many causes. These causes include, among others, uncorrected optical distortion of a lens, lack of flatness of the film or plate surfaces, refraction of air, and growth or shrinkage of photographic film. In image-forming systems where the final image must be as distortion free as possible, as in photogrammetric systems, it is essential that image distortion be maintained within a maximum allowable amount, so as to reproduce with the desired accuracy a correct image of an object surface. The more recent advances in the design of photogrammetric systems have required much closer accuracy than heretofore in reproducing the spatial relationships of cultural features of the earth's surface in images thereof to be represented in the final map. Of special importance in photogrammetric instruments is the requirement that the images which are formed on the mapping table or screen or viewed stereoscopically in an eyepiece are free of radial distortion. "Radial" is defined on page 803 of the Manual of Photogrammetry, edited by the American Society of Photogrammetry, 1944 edition, as being, "a line or direction from the radial center to any point on a photograph."

Optical designers have endeavored to compensate for radial image distortion in image-forming systems by utilizing light-refractive or reflective means at some point in the system whereby light rays may be bent in such a direction as to correct the distortion, but such methods of correction require expensive lens or other refractive or reflective means and seldom reduce radial distortion to zero.

Departing from such prior methods of compensation, my invention compensates for such radial distortion in a system comprising successive image-forming steps in which compensation is effected by non-refractive or non-reflective means. In one of said steps, an image of an object surface is formed by a lens on a shaped photo-sensitive image receiving surface of predetermined compensating form, located at an intermediate image position in the image-forming system. The image is developed so that it is retained on said shaped receiving surface, and in the next step, another image is formed this image being formed on a plane surface by a succeeding lens using the first-mentioned image as the object. The succeeding lens is aligned with the shaped receiving surface but has a different conjugate distance therefrom than the corresponding conjugate distance of the preceding lens, so as to produce a corrective radial distortion by these cooperative steps which substantially compensates the residual radial distortion of the final image produced by the image-forming system.

Accordingly, one object of the invention is to provide an improved method for compensating the residual radial distortion in the final image produced by an image-forming system.

Another object is to provide such a method of a simple and inexpensive character, which is nevertheless effective to compensate substantially all residual radial distortion of an ordinary nature arising from causes which are peculiar to image-forming systems.

A further object is to provide such a method for use in photogrammetric work whereby the accuracy of the stereoscopic model made by the use of the image-forming system is greatly improved.

These and other objects and advantages will be hereinafter more fully described, by reference to the following description and accompanying drawings in which:

Fig. 1 is a diagrammatic view of apparatus for carrying out a first and preliminary image-forming step in the method of my invention;

Fig. 2 is a similar view of apparatus for carrying out a second image-forming step in the said method;

Fig. 3 is a similar view of apparatus for carrying out a third image-forming step in accordance therewith;

Fig. 4 is an enlarged diagrammatic illustration of the principles of my invention in the same form as shown in Figs. 2, 3, 7 and 8;

Fig. 5 illustrates diagrammatically a modified application of my invention;

Fig. 6 illustrates another modified application on an enlarged scale;

Fig. 7 is a diagrammatical illustration of an image-forming step in a further application of my invention for producing a final image adapted for direct visual inspection and measurement;

Fig. 8 illustrates an image-forming step following that of Fig. 7 in the same application of the invention, and Fig. 9 is an analytical diagram explanatory of the steps shown in Figs. 7 and 8.

In carrying out my invention in the manner illustrated schematically in Figs. 1, 2 and 3, three image-forming steps are used to produce a final image such as desired for use in precision mapping operations. In the first of said steps, as illustrated diagrammatically in Fig. 1, an object surface 10, which represents the surface of the earth, is imaged upon a phototransparency 11, which may be photographic film or plate, by a lens 12 housed in an aerial camera 13, so as to form a negative image of a portion of the earth's surface on the phototransparency. In the second step, the phototransparency 11 is inserted in a printer device 14, Fig. 2, where a demagnified positive image of the phototransparency is formed by the printer lens 15 on a photosensitized plate 16 hereinafter more fully described and which in this form of the invention is preferably light transmitting. Plate 16 after development may be termed a diapositive and the positive image thereon is here designated the intermediate image. Printer 14 may be of any suitable form and, as shown in Fig. 2, it comprises lamps 17 which illuminate a light-diffusing plate 18 and hence provide a secondary light source for illuminating the phototransparency 11. In the third step, shown in Fig. 3, the diapositive plate 16 is placed in a projector device 19 of any desirable form having a lamp 21 and condensing lens 22 to provide illumination, so that an image of the diapositive is formed by a projector lens 23 on a final image plane 24 which may be the aforementioned photogrammetric table. It will be shown hereinafter that the desired compensation for residual radial distortion in the final image on the plane surface 24 is secured by the cooperative effect of these last two steps.

According to this invention, the correction of the residual radial distortion of the final image on plane surface 24 is accomplished by procedure in the following manner: firstly, by producing an imaging surface 25 of suitable compensating shape on diapositive plate 16 on which the intermediate image is formed; secondly, by selecting a suitable difference in the conjugate distances having designations P and K relating to lenses 15 and 23 respectively. The predetermined compensating shape of the imaging surface 25 and the difference between the conjugate distances P and K are so chosen that the resulting corrective radial distortion produced by their combined effect in the final image is substantially equal and opposite to the residual radial distortion which is produced by the optical system of the photogrammetric apparatus. As heretofore mentioned, substantially all the residual radial distortion ordinarily found in the final image on the final image plane 24 (the final map), resulting from the aforesaid causes, may be compensated by the method described above.

Because of the variation in the pattern of radial distortion of the final image produced by different optical systems due to the relative influence of the above-mentioned or other causes, the shape of the compensating image surface 25 will take different forms. Commonly, the shape is a surface of revolution, such as a spherical shape, as shown in Figs. 2, 3, 4, 5, 7, and 8, or a toroidal shape as shown in Fig. 6, but other compensating forms for surface 25 may be found necessary to counteract the residual radial distortion of the optical system.

Furthermore, if the uncorrected pattern of radial distortion of the optical system is not symmetrical with respect to the optical axis of the system, the geometrical center of the shaped surface 25 may be offset with respect to the center of the image formed thereon sufficiently to properly compensate for the decentralized pattern.

In photogrammetric systems where measurable radial distortion is present, the effectiveness of my method of compensating this distortion becomes apparent in the final image by employing a pair of photogrammetric stereoprojectors, one being shown in Fig. 3, by which two overlapping images are projected upon the mapping table. In the stereoprojectors, a pair of compensating diapositive plates 16, made with the same optical system, i. e., camera 13 and printer 14, and having images thereon of contiguous portions of the earth's surface, are placed in adjacent stereoprojectors. These stereoprojectors are so oriented that the overlapping portion of the projected images of the compensating diapositive plates 16 form a stereoimage in three dimensions. A model of the stereoimage is constructed therefrom on the mapping table by suitable known means. Likewise, models are made of other portions of the earth's surface, said models being contiguous to and partly overlapping the first model. When the compensating plate 16 is properly shaped to correct the residual radial distortion of the system, the overlapping portions of the images so produced will appear to conform to each other for every corresponding point in said overlapping portions, both in plan and in elevation. This compensation may be effected as herein described independently of other steps to improve the resolution of the final image.

It is necessary for securing this compensation that the lenses 15 and 23 have definite depth of focus and that the shaped surface, as 25 (Fig. 2), lie within such depth of focus of both of said lenses in both of the above described steps. In other words, the shaped surface 25 must lie entirely within the region of effective depth of focus of lens 15 when used in the printer 15 and also must lie within the region of effective depth of focus of the lens 23 when the diapositive plate 16 is transferred to the projector 19. These depths of focus of the two lenses are shown in Fig. 6, by way of illustration, as superimposed upon each other between the boundary lines 30a and 30b. With respect to each lens 15 and 23, there is assumed to be a reference plane 26 which is formed conjugately to an object plane by a lens of ideal characteristics. In Fig. 6 these reference planes 26 are shown by dotted line as being superimposed upon each other and planes 26 extend across the outer edges of the surface 25'' as shown.

Since the variable quantities employed in my method of compensation, i. e., the shape of the compensating surface 25 or 25'' and the difference in conjugate distances P and K can be expressed mathematically, the invention will be better understood by reference to the following mathematical analysis in connection with the diagram shown in Fig. 6. In one image-forming step, image rays 27, which emanate from a point on a phototransparency, not shown, pass through the node of lens 15 and impinge upon a given point B on the shaped surface 25''. These image rays 27 intersect the reference plane 26 at 28. In the next image-forming step the image rays 29, which are projected from the point B through the node of lens 23 to a final image plane, not shown, intersect the conjugate reference plane 26 at 31. With reference to Fig. 6, the relationship of the mathematical quantities involved in a rigorous determination of the corrective displacement of any given point in the intermediate image is expressed in the formula:

$$E = E_2 - E_1$$

where E is the intercept lying between intersection points 31 and 28 in the reference plane 26, and is the amount of linear correction in that plane necessary to compensate for the residual radial distortion of the optical system with respect to a given point 31. $E_2$ is the distance, measured in the reference plane 26, between the intersection point 31 and the intersection point 32 where a vertical line 56, extending through point B parallel to the optical axis of the optical system, intersects the reference plane 26. $E_1$ is the distance, measured in the reference plane 26, between the intersection point 32 and intersection point 28.

By geometry:

$$\frac{E_2}{r} = \frac{L}{K+L}$$

$$\frac{E_1}{r} = \frac{L}{P+L}$$

$$\frac{E_2 - E_1}{r} = L\left(\frac{1}{K+L} - \frac{1}{P+L}\right) = \frac{E}{r}$$

where $r$ is the perpendicular radial distance between the optical axis and the given point B on surface 25″. K and P are the conjugate distances from the nodes of lenses 23 and 15, respectively, to the conjugate reference plane 26. L is the vertical distance parallel to the optical axis from the given point B to the reference plane 26.

For most practical purposes, the next above formula may be simplified as follows:

$$\frac{E}{r^1} = L\left(\frac{1}{K} - \frac{1}{P}\right)$$

where $r^1$ is substituted for $r$ and is the radial distance along the reference plane 26 between the optical axis and intersection point 31 at which image ray 29 crosses plane 26.

$$\frac{1}{K} \text{ and } \frac{1}{P}$$

are used instead of $$\frac{1}{K+P} \text{ and } \frac{1}{P+L}$$

respectively, since L has a very small value compared to K and P, respectively, and its deletion from these quantities causes only a negligible difference in the results yielded by the formula in most cases.

The value of E, representing the total radial distortion from all causes in units of linear measure, as millimeters, is determined for any known value of $r^1$, as well understood in the art. The conjugate distances K and P from the nodes of lenses 23 and 15, respectively, to their individual planes of critical focus are known or can be measured. Then the formula is solved for a value of L. By substituting various values of E and $r^1$ in the formula, a point-to-point computation for values of L will yield a compensating surface 25″ of optimum shape to compensate residual radial distortion in the optical system.

It will be noted that the customary flat diapositive plate would not yield any such corrective distortion regardless of the different angularities of rays 27 and 29, since its surface would coincide with the reference plane 26 and the surface points, such as point B, on surface 25″ which produce the desired corrective distortion are not coincident with reference plane 26. Thus the lens 15 "views" the diapositive surface 25″ with a different perspective aspect than lens 23, resulting in a different angularity of the image rays 27 with respect to the optical axis of the optical system than the corresponding angularity of image rays 29.

Another adaption of my method is illustrated in Figs. 7 and 8 in which the residual radial distortion of the optical system is compensated in two steps, but in which the manner of effecting the compensation is somewhat different from that above described. The first step involves the use of a printing device 40 shown diagrammatically in dotted outline in Fig. 7. In the bottom of the printing device 40 are a plurality of lamps 41 beneath a diffusing screen 42 that provides illumination for the printing operation. A flat glass photographic plate 43 having a photographic image thereon is placed in the printing device over the screen 42 and an image of said photographic image is formed by a lens 44 upon a glass photographic plate 45 held in the top of the printing device and having a suitably curved, photosensitized surface 53. In the following step, the plate 45 is transferred to a viewing device 46, such as a system of instruments based on the stereocomparator or radial line method, which is fragmentarily and diagrammatically illustrated in Fig. 8. The plate 45 is secured upon a horizontally movable plate 47 which slides upon a base 48 and has a large aperture 49 underlying plate 45. Inserted into the base 48 is a light source and collimator unit 50 for projecting collimated light rays upwardly through the plate 45. A telescope 51 is held by a rigid arm 52 above the plate 45 in alignment with the collimator unit 50 so that image rays may be projected from the image on the plate 45 into the telescope where a portion of the image may be viewed by the observer. The entire image may be viewed in a small portion at a time by moving the table 47 in a horizontal plane, since the field of view of the telescope is very limited. A reticle (not shown) in the image plane of the telescope is used in conjunction with micro-adjustment controls which are connected to move table 47 so that the observer may measure the cultural features in the image on surface 53 by moving the table back and forth.

The manner in which residual radial distortion is compensated in this adaptation of my method is essentially in accordance with the theory heretofore stated and an explanatory diagram of the apparatus is shown in Fig. 9. Here the printer lens 44 is shown aligned on the axis 45′ of the compensating surface 53 on plate 45, the lens lying at a conjugate distance P from a conjugate reference plane 57 extending across the outer edges of plate 45 similar to conjugate reference plane 26. L is the vertical distance parallel to the axis 45′ of any given point B in the compensating surface 53 from the conjugate reference plane 57 and $r$ is the radial location of point B from the axis 45′. It will be seen that image rays 54, which are projected through the node of lens 44 to point B, cut the conjugate reference plane 57 at a different intersection point 58 than the intersection point 59 of the emergent image rays 55 which are projected away from point B parallel to axis 45′, thus providing an intercept E, between the intersection points.

In applying the formula $$\frac{E_2 - E_1}{r} = L\left(\frac{1}{K+L} - \frac{1}{P+L}\right)$$

to the application of my method shown in Figs. 7 and 8, the value of $E_2 = 0$ since the imaging or viewing rays 55 in Fig. 9 are parallel to the optical axis 45′. It is important to point out that image rays 54 and 55 in Fig. 9 correspond to image rays 21 and 29, respectively, in Fig. 6. It follows then that $K=\infty$ and the above formula becomes $$\frac{-E_1}{r}=L\left(-\frac{1}{P+L}\right)$$

$$-E_1=-\frac{rL}{P+L}=E$$

By the convention of signs, $E_1$ has a minus value because this intercept is directed from the intersection point 58 of ray 54 away from the optical axis. Conversely, intercept E in Fig. 6 has a positive value since it is directed toward the optical axis from the intersection point 28 where rays 27 cross the reference plane. The same is also true of Figs. 4 and 5.

Alternatively, it is possible to modify the above method to effect a correction for radial distortion by placing a flat photographic plate across the curved surface 53 in Fig. 8 and printing a final image on it by parallel light from the collimator 50. The above description of the method in connection with Figs. 7 and 8 emphasizes the fact that my invention is effective in correcting residual radial distortion even where but one projecting lens is employed in the two essential image-forming steps.

The apparatus shown in Fig. 3 utilizes a light-transmitting diapositive plate 16 which is trans-illuminated to make the final image but this plate could equally well be opaque in which case it would be directly lighted from the lens side.

An important advantage of my invention over lens means for correcting residual radial distortion is its low cost. Since no image rays are refracted or reflected by the compensating surface, no meticulous grinding and polishing operations are necessary like those used in producing lenses and a large part of the manufacturing expense is thereby saved.

It should be emphasized that every point in the compensating surface is located with regard to the elimination of radial distortion only, regardless of whether such a location improves or degrades resolution. However, resolution will always be of satisfactory quality since the entire compensating surface lies within the region of depth of focus of the lenses involved.

Although my invention has been described in only some of its adaptations to photogrammetry, it will be understood that the description is intended in an illustrative rather than a limiting sense, as it is contemplated that various other adaptations are possible, as well as various changes in the details of procedure without departing from the spirit of the invention as defined in the appended claims.

I claim:

1. The method of correcting residual optical radial distortion in the final image of an object produced by an image providing system comprising the steps of forming a body of shape-maintaining rigidity having a surface formed to produce a curved shape predetermined with reference to the optical distortion to be corrected and provided with a photo-sensitive coating, projecting an intermediate image of said object on said surface and projecting the image formed on said surface to produce an image of said object having a corrective optical radial distortion adapted to compensate for said distortion to be corrected.

2. The method of correcting residual optical radial distortion in the final image of an object produced by an image providing system comprising the steps of forming a body of shape-maintaining rigidity having a surface formed to produce a curved shape predetermined with reference to the optical distortion to be corrected, projecting an intermediate image of said object on said surface through one optical image-forming system and projecting the image formed on said surface on a second surface through a second optical image-forming system to produce an image of said object thereon having a corrective optical radial distortion adapted to compensate for said distortion to be corrected.

3. The method of correcting residual optical radial distortion in the final image of an object produced by an image providing system comprising the steps of forming a body of shape-maintaining rigidity having a surface formed to produce a curved shape predetermined with reference to the optical distortion to be corrected and provided with a photo-sensitive coating, projecting an intermediate image of said object on said surface through one optical image-forming system and projecting the image formed on said surface through a second optical image forming system to produce an image of said object having a corrective optical radial distortion adapted to compensate for said distortion to be corrected.

4. The method of correcting residual optical radial distortion in the final image of an object produced by an image providing system comprising the steps of forming a body of shape-maintaining rigidity having a surface formed to produce a curved shape predetermined with reference to the optical distortion to be corrected and provided with a photo-sensitive coating, projecting an intermediate image of said object on said surface and projecting the image formed on said surface through an optical viewing system for viewing an image of said object having a corrective optical radial distortion adapted to compensate for said distortion to be corrected.

5. The method of correcting residual optical radial distortion in the final image of an object produced by an image forming system comprising the steps of forming a body of transparent, substantially rigid material with a surface having a curved shape predetermined with reference to the optical distortion to be corrected and provided with a photo-sensitive coating, projecting an intermediate image of said object on said surface by an image forming means and projecting light through said body to project the image formed on the surface thereof to produce an image of said object having a corrective optical radial distortion adapted to compensate for said distortion to be corrected.

6. The method of correcting residual optical radial distortion in the final image of an object produced by an image forming system comprising the steps of forming a body with a surface having a curved shape predetermined with reference to the optical distortion to be corrected, and provided with a photo-sensitive coating, projecting an intermediate image of said object on said coated surface by one optical image forming means to form an image thereon and projecting the image formed on said coated surface by another optical image-forming means, said means being located at different coordinated effective focal distances from said surface, to produce an image of said object having a corrective optical radial distortion adapted to compensate for said distortion to be corrected.

7. The method of correcting residual optical radial distortion in the final image of an object produced by an image forming system comprising the steps of forming a body of transparent, substantially rigid material having a surface formed to produce a curved shape predetermined with reference to the optical distortion to be corrected and provided with a photo-sensitive coating, projecting an intermediate image of said object on said coated surface by one optical image forming means to form a diapositive image thereon and projecting said diapositive image by another optical image-forming means, said means being located at different coordinated effective focal distances from said surface to produce an image of said object having a corrective optical radial distortion adapted to compensate for said distortion to be corrected.

8. The method of correcting residual optical radial distortion in the final image of an object produced by an image forming system comprising the steps of forming a body of shape-maintaining rigidity with a surface of revolution having a curvature predetermined with reference to the optical distortion to be corrected and provided with a photo-sensitive coating, projecting an intermediate image of said object on said surface by one optical image forming lens means and projecting the image formed on said surface by another image-forming lens means, said means being located at different coordinated effective focal distances from said surface to produce an image of said object having a corrective optical radial distortion adapted to compensate for said distortion to be corrected.

9. The method of correcting residual radial distortion in the final image of an object produced by an image forming system comprising the step of forming a body with a surface having a curvature predetermined with reference to the distortion to be corrected, projecting an intermediate image of said object on said surface by an image forming means, and projecting the image formed on said surface through another image forming means to produce a final corrected image, both of said image forming means being located at effective focal distances from said surface and one at a greater focal distance from said surface than the other, so that image rays projected by the first mentioned image forming means to any point of said surface extend at a different angle to the optical axis of said system than rays extending from said point through said other image forming means, to thereby form said final image having a corrective radial distortion adapted to compensate for said distortion to be corrected.

10. The method of correcting residual radial distortion in the final image of an object produced by an image forming system comprising the steps of forming a body with a surface having a curved shape predetermined with reference to the distortion to be corrected, providing said surface with a photo-sensitive coating, projecting an intermediate image of said object on said coated surface by an image forming means, and projecting the image formed on said coated surface through another image forming means to produce a final corrected image, both of said image forming means being located at effective focal distances from said coated surface and one at a greater focal distance from said surface than the other, so that image rays projected by the first mentioned image forming means to any point of said surface extend at a different angle to the optical axis of said system than rays extending from said point through said other image forming means, to thereby form said focal image having a corrective radial distortion adapted to compensate for said distortion to be corrected.

11. The method of correcting residual optical radial distortion in the final image of an object produced by an image providing system comprising the steps of forming a transparent, substantially rigid body having a surface formed to produce a curved shape predetermined with reference to the optical distortion to be corrected, projecting an intermediate image of said object on said surface by an image forming means, and projecting light through said body to project the image formed on said surface through another image forming means to produce a final corrected image, both of said image forming means being located at effective focal distances from said surface and one at a greater focal distance from said surface than the other, so that image rays projected by the first mentioned image forming means to any point of said surface extend at a different angle to the optical axis of said system than rays extending from said point through said other image forming means, to thereby form said final image having a corrective optical radial distortion adapted to compensate for said distortion to be corrected.

12. The method of correcting residual optical radial distortion in the final image of an object produced by an image forming system comprising the steps of forming a body of transparent, substantially rigid material having a surface formed to produce a curved shape predetermined with reference to the optical distortion to be corrected, providing said surface with a photo-sensitive coating, projecting an intermediate image of said object on said coated surface by an image forming lens means, developing said intermediate image to form a diapositive image on said surface, and projecting light through said body to project said diapositive image through another image forming lens means to produce a final corrected image, both of said lens means being located at effective focal distances from said surface and one at a greater focal distance from said surface than the other, so that the image rays projected by the first mentioned lens means to any point of said surface extend at a different angle to the optical axis of said system than rays extending from said point through said other lens means, to thereby form said final image having a corrective optical radial distortion adapted to compensate for said distortion to be corrected.

JOHN V. SHARP.

REFERENCES CITED

The following references are of record in the file of this patent:

UNITED STATES PATENTS

| Number | Name | Date |
| --- | --- | --- |
| 1,082,678 | Casler | Dec. 30, 1913 |
| 1,421,523 | Mechau | July 4, 1922 |
| 1,565,413 | Brock et al. | Dec. 15, 1925 |
| 1,910,425 | Cahill | May 23, 1933 |
| 1,980,981 | Cooke | Nov. 20, 1934 |
| 2,049,041 | Berggren | July 28, 1936 |
| 2,248,976 | Files | July 15, 1941 |
| 2,265,992 | Beck | Dec. 16, 1941 |